(12) United States Patent
Weiss et al.

(10) Patent No.: US 7,519,455 B2
(45) Date of Patent: Apr. 14, 2009

(54) METHOD AND DEVICE FOR A VEHICLE-RELATED TELEMATICS SERVICE

(75) Inventors: Cornelia Weiss, Leonberg (DE); Joerg Fischer, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 10/517,040

(22) PCT Filed: May 20, 2003

(86) PCT No.: PCT/DE03/01627

§ 371 (c)(1),
(2), (4) Date: Aug. 16, 2005

(87) PCT Pub. No.: WO03/105094

PCT Pub. Date: Dec. 18, 2003

(65) Prior Publication Data

US 2006/0235580 A1    Oct. 19, 2006

(30) Foreign Application Priority Data

Jun. 10, 2002 (DE) .............................. 102 25 788
Nov. 20, 2002 (DE) .............................. 102 54 284

(51) Int. Cl.
*G05D 1/00* (2006.01)
*G05D 3/00* (2006.01)
(52) U.S. Cl. ................................ 701/2; 701/29; 700/17
(58) Field of Classification Search .................... 701/2, 701/24, 211, 213, 29; 455/436; 340/438, 340/425.5; 370/466; 700/17
See application file for complete search history.

(56) References Cited

U.S. PATENT DOCUMENTS

| | | | | |
|---|---|---|---|---|
| 6,640,238 | B1* | 10/2003 | Bowman-Amuah | 709/201 |
| 6,647,323 | B1* | 11/2003 | Robinson et al. | 701/1 |
| 6,832,141 | B2* | 12/2004 | Skeen et al. | 701/35 |
| 2001/0048680 | A1* | 12/2001 | Yoshimura et al. | 370/389 |
| 2002/0010938 | A1* | 1/2002 | Zhang et al. | 725/95 |
| 2002/0044049 | A1* | 4/2002 | Saito et al. | 340/438 |
| 2002/0049535 | A1* | 4/2002 | Rigo et al. | 701/211 |
| 2004/0083041 | A1* | 4/2004 | Skeen et al. | 701/35 |

(Continued)

FOREIGN PATENT DOCUMENTS

DE    100 26 754    12/2001

(Continued)

OTHER PUBLICATIONS

Experimental Evaluation of an Industrial Application Layer Protocol Over Wireless Systems; Vitturi, S.; Carreras, I.; Miorandi, D.; Schenato, L.; Sona, A.; Industrial Informatics, IEEE Transactions on; vol. 3, Issue 4, Nov. 2007 pp. 275-288 Digital Object Identifier 10.1109/TII.2007.911892.*

(Continued)

*Primary Examiner*—Cuong H Nguyen
(74) *Attorney, Agent, or Firm*—Kenyon & Kenyon LLP

(57) ABSTRACT

A method and a device for a vehicle-related telematics service are provided, the same application protocol being utilized for the telematics service both for the air interface and for the communication in the vehicle and possibly in the service center.

14 Claims, 4 Drawing Sheets

U.S. PATENT DOCUMENTS

| | | | | |
|---|---|---|---|---|
| 2005/0085239 | A1* | 4/2005 | Cedervall | 455/456.1 |
| 2005/0096809 | A1* | 5/2005 | Skeen et al. | 701/29 |
| 2005/0154500 | A1* | 7/2005 | Sonnenrein et al. | 701/1 |
| 2006/0241784 | A1* | 10/2006 | Fredriksson | 700/17 |
| 2007/0010922 | A1* | 1/2007 | Buckley | 701/29 |
| 2007/0013572 | A1* | 1/2007 | Fredriksson | 341/156 |
| 2007/0083303 | A1* | 4/2007 | O'Sullivan et al. | 701/29 |
| 2008/0031207 | A1* | 2/2008 | Martinez et al. | 370/338 |
| 2008/0171537 | A1* | 7/2008 | Chiu | 455/412.2 |

FOREIGN PATENT DOCUMENTS

| | | | |
|---|---|---|---|
| EP | 1526749 | A2 * | 4/2005 |
| JP | 10133905 | | 5/1998 |
| JP | 11161510 | | 6/1999 |
| JP | 2000289583 | | 10/2000 |
| JP | 02007243446 | A * | 9/2007 |
| WO | WO 03/063448 | | 7/2003 |
| WO | WO 2008100283 | A2 * | 8/2008 |

OTHER PUBLICATIONS

Convergence of telecommunications and computing to networking models for integrated services and applications; Decina, M.; Trecordi, V.; Proceedings of the IEEE; vol. 85, Issue 12, Dec. 1997 pp. 1887-1914; Digital Object Identifier 10.1109/5.650174.*

The generic framing procedure (GFP): an overview; Hernandez-Valencia, E.; Scholten, M.; Zhenyu Zhu; Communications Magazine, IEEE; vol. 40, Issue 5, May 2002 pp. 63-71; Digital Object Identifier 10.1109/35.1000215.*

Platform-independent IP transmission over wireless networks: the WINE approach; Mahonen, P.; Saarinen, T.; Passas, N.; Orphanos, G.; Personal Communications, IEEE [see also IEEE Wireless Communications]; vol. 8, Issue 6, Dec. 2001 pp. 32-40 ; Digital Object Identifier 10.1109/98.972166.*

Unified transport layer support for data striping and host mobility; Goff, T.; Phatak, D.S.; Selected Areas in Communications, IEEE Journal on; vol. 22, Issue 4, May 2004 pp. 737-746; Digital Object Identifier 10.1109/JSAC.2004.826001.*

Balancing transport and physical Layers in wireless multihop networks: jointly optimal congestion control and power contro; Mung Chiang; Selected Areas in Communications, IEEE Journal on; vol. 23, Issue 1, Jan. 2005 pp. 104-116 Digital Object Identifier 10.1109/JSAC.2004.837347(410) 23.*

The ATSC Transport Layer, Including Program and System Information Protocol (PSIP); Lechner, B.J.; Chernock, R.; Eyer, M.K.; Goldberg, A.; Goldman, M.S.; Proceedings of the IEEE; vol. 94, Issue 1, Jan. 2006 pp. 77-101; Digital Object Identifier 10.1109/JPROC.2005.861717.*

Location-Aware Services over Vehicular Ad-Hoc Networks using Car-to-Car Communication; Dikaiakos, M.D.; Florides, A.; Nadeem, T.; Iftode, L.; Selected Areas in Communications, IEEE Journal on; vol. 25, Issue 8, Oct. 2007 pp. 1590-1602; Digital Object Identifier 10.1109/JSAC.2007.071008.*

Test Tools for Road Safety Telematic Systems; Polglase, J.B.; Angelat, C.C.; Ortega, A.P.; Vehicular Technology Conference, 2007. VTC2007-Spring. IEEE 65th: Apr. 22-25, 2007 pp. 2560-2564; Digital Object Identifier 10.1109/VETECS.2007.527.*

Home Agent Placement Optimization for HAP-Based Network Mobility; Vilhar, A.; Novak, R.; Wireless Communication Systems, 2005. 2nd International Symposium on; Sep. 5-7, 2005 pp. 873-877; Digital Object Identifier 10.1109/ISWCS.2005.1547836.*

A disconnection-tolerant transport for drive-thru Internet environments; Ott, J.; Kutscher, D.; INFOCOM 2005. 24th Annual Joint Conference of the IEEE Computer and Communications Societies. Proceedings IEEE; vol. 3, Mar. 13-17, 2005 pp. 1849-1862 vol. 3; Digital Object Identifier 10.1109/INFCOM.2005.1498464.*

Remote diagnosis server architecture; Somnath, D.; Ghoshal, S.; AUTOTESTCON Proceedings, 2001. IEEE Systems Readiness Technology Conference; Aug. 20-23, 2001 pp. 988-998; Digital Object Identifier 10.1109/AUTEST.2001.949478.*

Vehicle Ad Hoc networks: applications and related technical issues; Toor, Y.; Muhlethaler, P.; Laouiti, A.; Communications Surveys & Tutorials, IEEE; vol. 10, Issue 3, Third Quarter 2008 pp. 74-88; Digital Object Identifier 10.1109/COMST.2008.4625806.*

Service discovery for mobile Ad Hoc networks: a survey of issues and techniques; Ververidis, C.N.; Polyzos, G.C.; Communications Surveys and Tutorials, IEEE; vol. 10, Issue 3, Third Quarter 2008 pp. 30-45; Digital Object Identifier 10.1109/COMST.2008.4625803.*

Ambient network composition; Belqasmi, F.; Glitho, R.; Dssouli, R.; Network, IEEE vol. 22, Issue 4, Jul.-Aug. 2008 pp. 6-12 Digital Object Identifier 10.1109/MNET.2008.4579765.*

Cognitive radio network management; Cheng-xiang Wang; Hsiao-hwa Chen; Xuemin Hong; Guizani, M.; Vehicular Technology Magazine, IEEE; vol. 3, Issue 1, Mar. 2008 pp. 28-35; Digital Object Identifier 10.1109/MVT.2008.919405.*

Mobility management protocols for next-generation all-IP satellite networks [architectures and protocols for mobility management in all-IP mobile networks]; Shahriar, A.Z.M.; Atiquzzaman, M.; Rahman, S.;Wireless Communications, IEEE [see also IEEE Personal Communications]; vol. 15, Issue 2, Apr. 2008 pp. 46-54.*

A cross-layer optical circuit provisioning framework for data intensive IP end hosts; Weiqiang Sun; Guowu Xie; Yaohui Jin; Wei Guo; Weisheng Hu; Xinhua Lin; Min-You Wu; Wentao Li; Rong Jiang; Xueqin Wei; Communications Magazine, IEEE; vol. 46, Issue 2, Feb. 2008 pp. S30-S37; Digital Object Identifier 10.1109/MCOM.2008.4473084.*

Think inside the box! optimizing web services performance today [web services in telecommunications, part II]; Zilora, S.J.; Ketha, S.S.; Communications Magazine, IEEE; vol. 46, Issue 3, Mar. 2008 pp. 112-117; Digital Object Identifier 10.1109/MCOM.2008.4463781.*

Wireless Mesh Networks for Public Safety and Crisis Management Applications; Portmann, M.; Pirzada, A.A.; Internet Computing, IEEE; vol. 12, Issue 1, Jan.-Feb. 2008 pp. 18-25; Digital Object Identifier 10.1109/MIC.2008.25.*

Building an Application-Aware IPsec Policy System; Heng Yin; Haining Wang; Networking, IEEE/ACM Transactions on vol. 15, Issue 6, Dec. 2007 pp. 1502-1513; Digital Object Identifier 10.1109/TNET.2007.896536.*

.NET Framework and Web Services: A Profit Combination to Implement and Enhance the IEEE 1451.1 Standard; Viegas, V.; Pereira, J.M.D.; Girao, P.M.B.; Instrumentation and Measurement, IEEE Transactions on; vol. 56, Issue 6, Dec. 2007 pp. 2739-2747; Digital Object Identifier 10.1109/TIM.2007.908136.*

Cross-Layer Design for QoS Support in Multihop Wireless Networks; Qian Zhang; Ya-Qin Zhang; Proceedings of the IEEE vol. 96, Issue 1, Jan. 2008 pp. 64-76; Digital Object Identifier 10.1109/JPROC.2007.909930.*

DICOM Image Communication in Globus-Based Medical Grids; Vossberg, M.; Tolxdorff, T.; Krefting, D.; Information Technology in Biomedicine, IEEE Transactions on; vol. 12, Issue 2, Mar. 2008 pp. 145-153; Digital Object Identifier 10.1109/TITB.2007.905862.*

Ambient network composition; Belqasmi, F.; Glitho, R.; Dssouli, R.; Network, IEEE; vol. 22, Issue 4, Jul.-Aug. 2008 pp. 6-12; Digital Object Identifier 10.1109/MNET.2008.4579765.*

Fault tolerance for highly available internet services: concepts, approaches, and issues; Ayari, N.; Barbaron, D.; Lefevre, L.; Primet, P.; Communications Surveys & Tutorials, IEEE; vol. 10, Issue 2, Second Quarter 2008 pp. 34-46 Digital Object Identifier 10.1109/COMST.2008.4564478.*

DTN: an architectural retrospective; Fall, K.; Farrell, S.; Selected Areas in Communications, IEEE Journal on; vol. 26, Issue 5, Jun. 2008 pp. 828-836; Digital Object Identifier 10.1109/JSAC.2008.080609.*

* cited by examiner

METHOD AND DEVICE FOR A VEHICLE-RELATED TELEMATICS SERVICE

FIELD OF THE INVENTION

The present invention relates to a method and a device for a vehicle-related telematics service with an action on at least one functionality in a motor vehicle via an air interface such as a mobile radio network or the communication via a bluetooth connection. One realization example of such a service is the remote diagnosis in the motor vehicle.

BACKGROUND INFORMATION

The proliferation of networked control units in today's motor vehicles offers more and more opportunities for influencing functionalities in the vehicle, for instance better diagnosis options in the case of a fault, or possibilities for remote operation of functions and/or components of the vehicle. Concepts are available in this context that allow reliable and secure access to the functionality in the vehicle across various distances using radio-communication-based intervention, for example, for performing reliable and high-quality fault diagnosis via remote diagnosis by a service center or via a remote diagnosis server having a corresponding diagnostic database. According to these approaches, communication systems integrated in the vehicle such as mobile phones and/or GSM-supported telematics-data terminals are utilized to transmit data between the control units connected to a vehicle network and/or components and the server of the service center. One proposal for such a system is described in German Patent Application No. DE 100 26 754. A concrete realization of such a system or the respective server and data terminals is not indicated.

SUMMARY

Utilizing a protocol that is already being used in the diagnosis of vehicle-control units for the implementation of a remote diagnosis has the advantage that the control units to be diagnosed will not need to be adapted to any other communication standards such as Internet communication standards, for example. The reason for this is that the service center communicates with the vehicle on the basis of the protocols utilized in the vehicle anyway. In this way, it is possible to provide remote-access possibilities even for current vehicles, without this requiring essential modifications of the control units. That is to say, the particular telematics service generally utilizes a protocol (application protocol in general) that is also used in the vehicle to implement the corresponding service locally.

Particularly advantageous in this context is a gateway device, which is located inside the vehicle and is responsible for receiving and transmitting data via the air interface and for providing the additionally required security functions.

It is particularly advantageous if the KWP2000 protocol, which is widely accepted as standard in the automotive industry, is utilized as protocol for the remote-diagnosis intervention. This protocol is used not only inside the vehicle, but is utilized also for the communication between the onboard component and the server in the distributed form of the remote diagnosis.

By suitable implementation, the timing conditions to be observed inside the vehicle are taken into account in an especially advantageous manner and the dead time resulting from the air transmission is compensated.

An especially advantageous feature is that complete messages are transmitted via the air interface, which are then fragmented in the vehicle or in the server in order to comply with the timing conditions of the utilized transport protocol.

Further advantages are derived from the following description of exemplary embodiments.

BRIEF DESCRIPTION OF THE DRAWINGS

Hereinafter, the present invention is explained in greater detail on the basis of example embodiments depicted in the figures.

DETAILED DESCRIPTION OF EXAMPLE EMBODIMENTS

Figure 1:
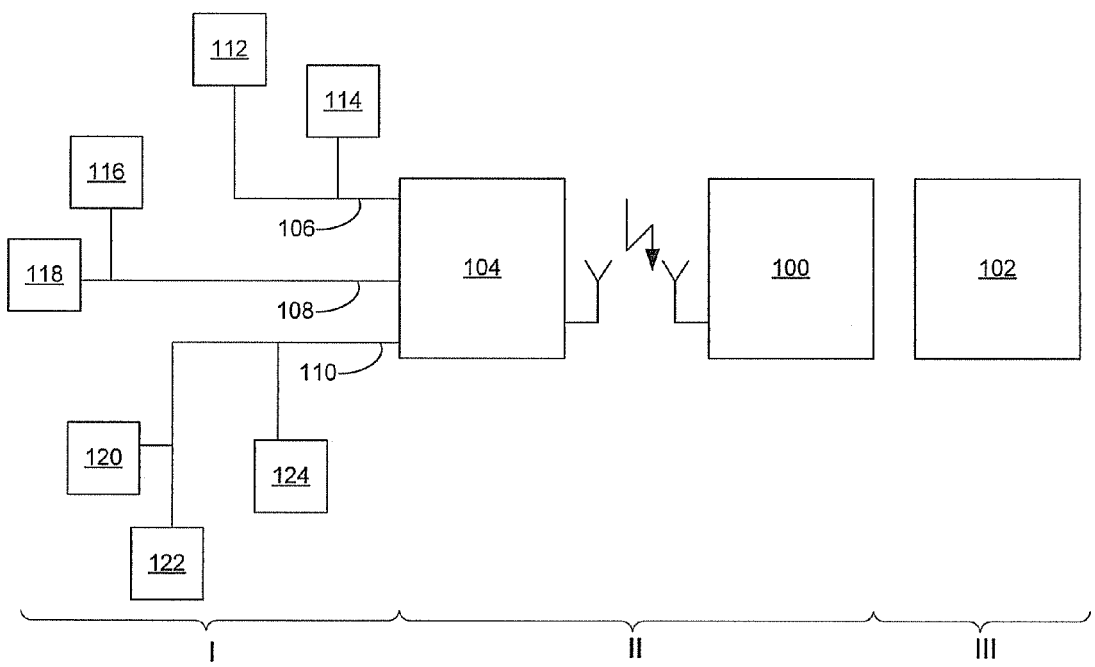
FIG. 1 shows an overall view of a system architecture for remote access.

FIG. 1 shows an overall representation of a system for a vehicle-related telematics service, information being exchanged between a vehicle (at least one data terminal in the vehicle) and a server via a mobile radio network or via a data network such as the Internet. The system architecture for remote access shown in FIG. 1 in the form of an overall representation is used in connection with functions for remote action, remote diagnosis, remote service, software download etc. Remote action or remote querying is generally understood as the remote control of vehicle functions, in particular comfort functions such as turning on the parking heater etc. and querying vehicle statuses and/or operating parameters. In the process, the user initiates a communication with the vehicle via a central server, or the user communicates directly with the vehicle. Remote diagnosis includes the remote reading out of diagnostic data from the vehicle, their analysis and possibly the generation of a recommendation regarding further steps. The analysis of the data and generation of the recommendation are performed by a central server, which is connected to the vehicle via a mobile radio network, via a wire-bound network and/or via a data network such as the Internet. Also to be mentioned as functions in this context is the so-called software download or remote flashing by which a new program code or new parameters may be loaded into software-configurable systems in the vehicle, such as control units, in order to improve their functionalities or their performance. Here, too, the communication is carried out via a mobile radio network, a wire-bound network and/or the Internet, for instance, going out from a central computer (server) or service center. Remote servicing is generally the monitoring of the vehicle state and accessing of service data in the vehicle originating from a central location so as to check whether, when and which measures are implemented to maintain the setpoint state. One such example is the dynamic adaptation of service intervals. Overall, these functionalities are subsumed here under the term of vehicle-related telematics service.

FIG. 1 shows an overview of the system architecture for remote access. Shown as I are the control units, to be influenced via remote access, in the vehicle; shown as II are gateway devices for protocol transformation and for security functions; and shown as III is the data terminal on the service-center side such as a workshop tester, an operator console, etc. Onboard gateway device 104 is connected to a gateway device 100 of a service center by means of an air interface. Depending on the exemplary embodiment, this is a bluetooth interface, a GSM interface, a GPRS interface or some other type of interface. For a data exchange, gateway device 100 is also connected to data terminal 102 on the service-center side. This user terminal is either a workshop tester, an operator console or a similar device. In an alternative embodiment, the gateway device of the service center is not directly connected to the air interface, but, via a data network such as the Internet, is connected to a service provider whose server is in turn connected to the air interface. Depending on the exemplary embodiment, onboard gateway device 104 is a central gateway for the vehicle or a point-to-point gateway connecting a bluetooth interface or a GSM module, for example, to a CAN subnet of the vehicle. In the exemplary embodiment shown, which is also preferred in reality, gateway device 104 is a central gateway, which is configured to receive and transmit data via the air interface and which provides the additionally required security functions, if appropriate. On the other side, gateway device 104 is connected, via one or a variety of bus systems 106, 108 and 110, to control units 112 through 124 to be diagnosed in vehicle 112. The buses are, for example, a comfort and vehicle-body bus such as a low-speed CAN or LIN bus, which interconnects control units for the air-condition system and the instrument cluster, and also an infotainment bus such as a high-speed CAN, MOST, fireWire bus etc., which connects the car radio and navigation systems, or a high-speed CAN bus or flexRay bus, which interlinks the control units for engine control, brake control, restraining systems, etc. Furthermore, a GSM module is connected to the gateway device (not shown in FIG. 1) via a serial or parallel interface (for example UART), with whose aid the vehicle exchanges data with the service center. Gateway device 104 may possibly also include a firewall by which the vehicle subnets are shielded from the outside.

Gateway device 100 on the service-center side generally includes the same functions and elements as gateway device 104 inside the vehicle. The gateway device ensures the communication with data terminal 102 and operates the air interface. This example embodiment also includes a GSM module, which is operated by the gateway device via a UART driver. If provision is made for encryption of the transmission channel, the required encryption and decryptions are performed in both gateway devices. In addition, the two gateway devices include the required protocol transformations, i.e., the implementation of the received or transmitted data from the protocol of the air interface, such as the GSM protocol, into or out of the protocol of the vehicle system, such as the CAN protocol.

For the communication of the two gateway devices with one another via the air interface a connection is established. This is a GSM connection in the example embodiment, but different transport protocols are utilized in other embodiments. The system architecture shown in FIG. 1 utilizes, for the message transmission, a protocol that, in the diagnosis case, is also used in the diagnosis of the control units in the vehicle. Such protocols normally operate under certain timing conditions. The so-called KWP2000 diagnosis protocol, for example, is such a protocol that—possibly in modified form—is utilized in a multitude of applications in connection with motor vehicles. However, the subject matter described here is not limited to only the use of the specific KWP2000 protocol in the diagnosis, but is utilized in connection with other protocols and/or services as well. Narrow timing conditions must generally be observed in the motor vehicle. After establishing and authorizing a connection between the two gateway units, a message exchange is basically carried out on the basis of the utilized protocol. The gateway unit forwards messages arriving in the vehicle, such as KWP2000 request messages, to the control unit to be diagnosed and transmits its replies, such as the KWP2000 response messages, to the gateway in the service center. The service-center gateway operates in an analogous manner. In a preferred exemplary embodiment, gateway device 104 in the vehicle may also be directly connected to a testing device, which interacts with the control unit to be diagnosed on the basis of the same protocol utilized in the distributed application within the framework of remote action.

It may be problematic that the diagnosis protocol used in the vehicle, such as the KWP2000, generally prescribes very narrow timing conditions with respect to the communication with the connected testing unit. If these timing conditions are not observed, the diagnostic procedure will be terminated. The timing conditions are so narrow that they are unable to be satisfied because of the transmission delay inherent in the air interface. Therefore, as described in the following, the synchronous connection between control unit and testing unit is decoupled in the illustrated distributed application and an asynchronous connection provided via the air interface. In the process, the synchronous connection, in this case between gateway device and control unit to be diagnosed, is maintained inside the vehicle system, and possibly on the service-center side as well, where a synchronous connection may exist between service-center gateway and testing unit. On the other hand, the air-interface connection is asynchronous and does not adhere to the timing conditions of the utilized diagnosis protocol, but instead complies only with the timing conditions of the protocol used there. The gateway device in the vehicle and/or that in the service center is therefore configured in such a way that it controls the connection to the service center on the one hand and the time-critical connection to the control unit to be diagnosed on the other hand.

Figure 2:
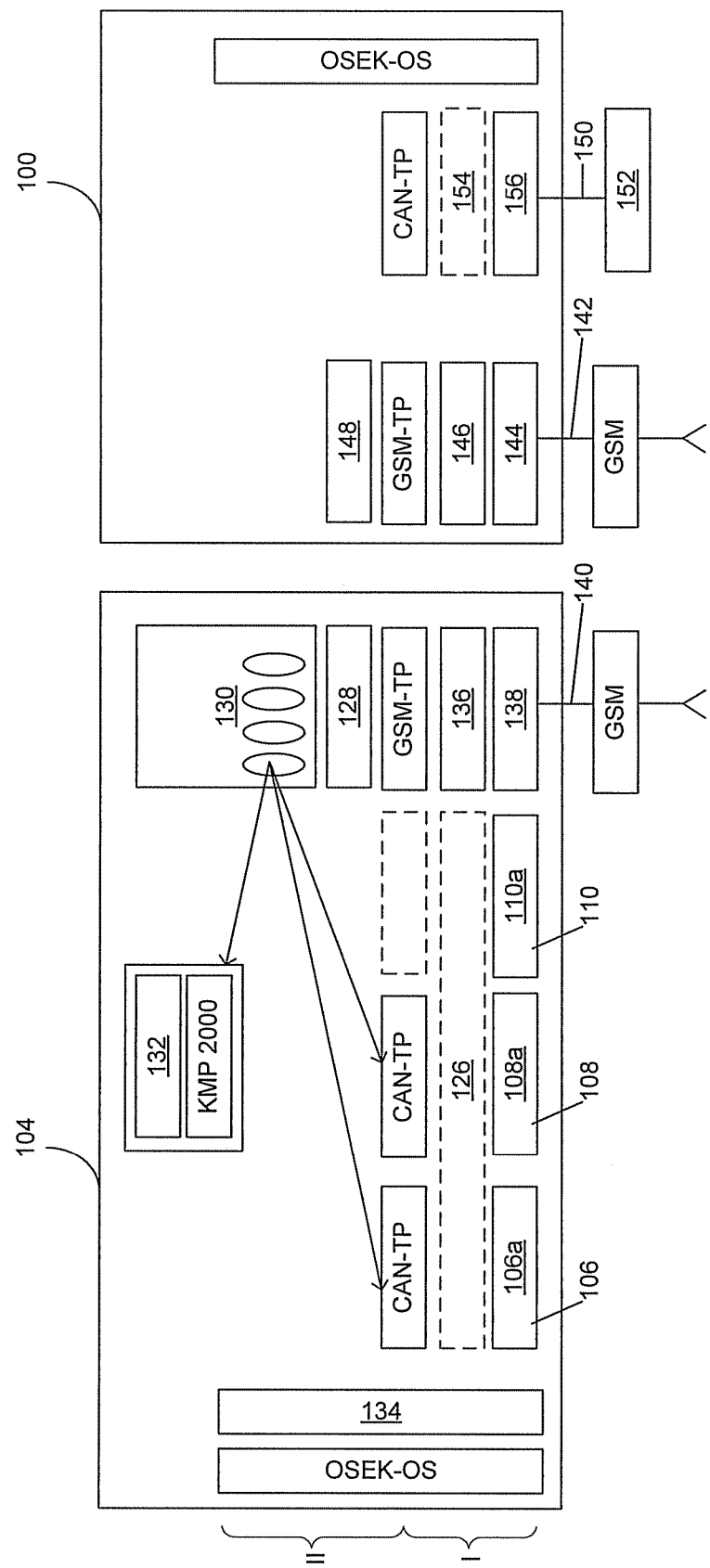
FIG. 2 shows a layer model of a gateway system in the onboard component of the remote-access system and a corresponding gateway device in the central component.

FIG. 2 shows a layer model of gateway device 104 in the vehicle. Gateway device 100 in the service center is configured accordingly. Gateway device 104 in the vehicle integrates all required layers of a communication system for the linking of at least one vehicle subnet and for communicating with a service center via an air interface. In the exemplary embodiment shown in FIG. 2, gateway device 104 connects a total of three vehicle subnets, 106, 108 and 110, which were already shown with the aid of FIG. 1, and integrates a GSM-protocol stack for the data exchange with a service center. The layer model describes communication system I and application system II of the gateway. In the preferred exemplary embodiment, subsystem drivers 106a, 108a and 110a, preferably CAN drivers, are provided in the bottom layer of communication system 1 for each vehicle. Superordinate to the drivers, as second layer, is a CAN network layer 126, which implements the messages received from the various subsystems and which are to be distributed to particular subsystems or to the air interface. The network layer is in charge of in-vehicle routing of messages, which are CAN messages in the exemplary embodiment. Above the network layer is the transport-protocol layer, preferably the CAN transport-protocol layer, which is assigned to the individual subsystem. This transport protocol is required to transmit messages that are longer than the maximum data length of the subsystem messages, which is longer than 8 data bytes in CAN applications, the transmission being carried out via the individual subsystem. Located in application system II are, for instance, security services 128, which are responsible for encryption, authentication and authorization of remote access. Remote services 130, which the vehicle offers to the outside, are located here as well. These are, for example, remote-diagnosis services, remote-control services, remote-service services, software-download services, etc. All inquiries via the air interface are always forwarded to one of these remote services. This remote service decides whether a message will be forwarded within the vehicle. Due to this coupling in the application system, it is possible to satisfy the most stringent security demands. If the gateway itself is able to be diagnosed, diagnosis-assistance service KWP2000 will also be utilized in addition to diagnosis application 132. Apart from the mentioned elements, the vehicle gateway also includes a network management as well as local and global management of the operating states and also the system diagnosis, which will not be discussed further in the following. Moreover, a real-time operating system (such as an OSEK—conforming OS) and a monitoring module (134) are provided. For the operation of the air interface, gateway 104 also includes a GSM transport protocol, a GSM network layer 136 and a UART driver 138 as well, which is connected to a GSM module via an SPI interface 140.

Gateway device 100 in the service center is configured accordingly. It couples from GSM to a subsystem, preferably a CAN, and vice versa. Here, too, a GSM module is therefore connected to a UART driver 144 via an interface 142. Superposed is a GSM network layer 146 and a GSM transport protocol. Security services 148 correspond to those in vehicle gateway 104. A service tester 152 or a console is connected via a CAN subsystem 150. Here as well, the CAN connection is provided via a CAN transport protocol, a CAN network layer 154 and a CAN driver 156. The coupling from GSM to a CAN bus system in the service center permits the direct connection of diagnostic tester 152 or the forwarding of the data to a PC, which evaluates them accordingly. If remote-diagnosis data are to be made available via the Internet, a coupling to IP-based protocols will be performed in gateway 100. In another embodiment, the diagnosis results are recorded in a database in the service center and then made available to a service on the Internet. The mapping to an IP-based communication is always carried out at a central location in the service center and not in each vehicle.

The remote service 'remote diagnosis' is shown in FIG. 2 in 130 as left oval. This application includes programs that are configured in such a way that they decide upon arrival of a diagnosis request whether this request is meant for self-diagnosis of the gateway or whether it is meant for a control unit located at one of the connected buses. A table is provided for this purpose in which the control-unit configurations of the vehicle (such as identification number, fault memories to be read out, etc.) are listed and on the basis of which the arriving message is conveyed to the appropriate bus. When changing the control-unit configuration, this table must therefore be adjusted as well. As mentioned before, a diagnosis protocol, which works within tight time frames, is utilized for diagnosing the individual control units in the vehicle. Furthermore, the bus systems utilized in the vehicle usually have a limited message length. Generally, the messages provided in the diagnosis protocol have a maximum length that deviates therefrom. For instance, a maximum length of 255 bytes is currently provided for KWP2000 messages, whereas the CAN protocol utilized in the vehicle is limited to 8 bytes. Furthermore, a transport protocol, which includes several timing conditions in the range of a few milliseconds, is integrated in each control unit to be diagnosed via KWP2000 and CAN. The transmission delay via GSM amounts to at least 600 milliseconds. For this reason, a transparent transmission of CAN messages from the control unit to be diagnosed to the service center is not possible, so that the use of a special transport protocol inside the gateway device cannot be avoided. Depending on the design, it must perform a time decoupling and/or an adaptation of the data lengths. The peer entities of the transport layer in the security gateway of the vehicle are responsible for compliance with the timing conditions in the transport layer of the control unit to be diagnosed, and the transport layer in the gateway of the service center correspondingly ensures compliance with the timing conditions in the peer entities of the transport layer of the tester. Furthermore, the transport layer in the gateway adapts the data lengths by fragmenting or defragmenting the data. Any transport protocol may be used to transmit complete messages such as KWP2000 messages via GSM.

Figure 3:
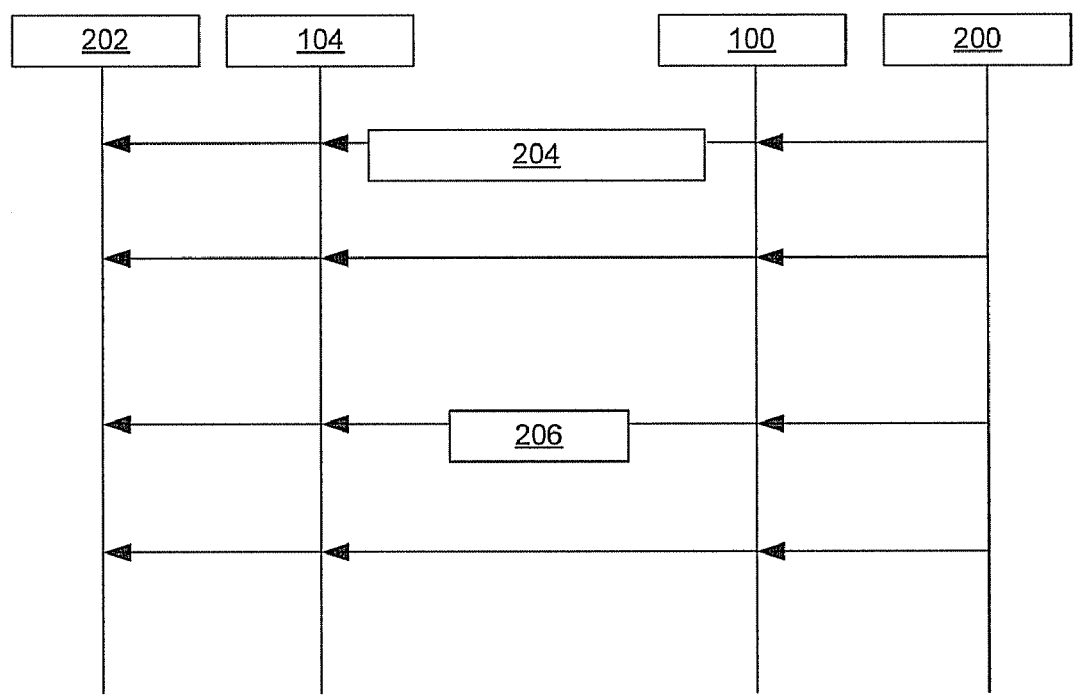
FIG. 3 shows a flow chart of the message exchange between a control unit to be diagnosed and a service center.

FIG. 3 shows a flow chart representing the message exchange between the participating components in the utilization phase of remote diagnosis for the used diagnosis protocol KWP2000.

Shown is the message exchange between the service center (such as tester 200), gateway 100 of the service center, gateway 104 of the vehicle and control unit 202 to be diagnosed. As a first message, originating from tester 200 by way of gateway 100, a KWP2000 message is sent via the air interface, which brings the control unit to be diagnosed into diagnosis mode once the message has been forwarded by gateway 104. The service center transmits the KWP2000 messages between the gateways via the GSM connection in transparently encrypted form. The implementation of the message onto the other protocols takes places in the transport layers of the gateway. This is followed by cyclical, so-called tester-present messages, which originate from the tester and are required to keep the control unit to be diagnosed in diagnosis mode. As soon as the control unit to be diagnosed is in diagnosis mode, the actual diagnosis will begin during which messages with useful data are transmitted from the service center to the control unit and vice versa (KWP2000 diagnosis-request messages as well as KWP2000 response messages).

Figure 4:
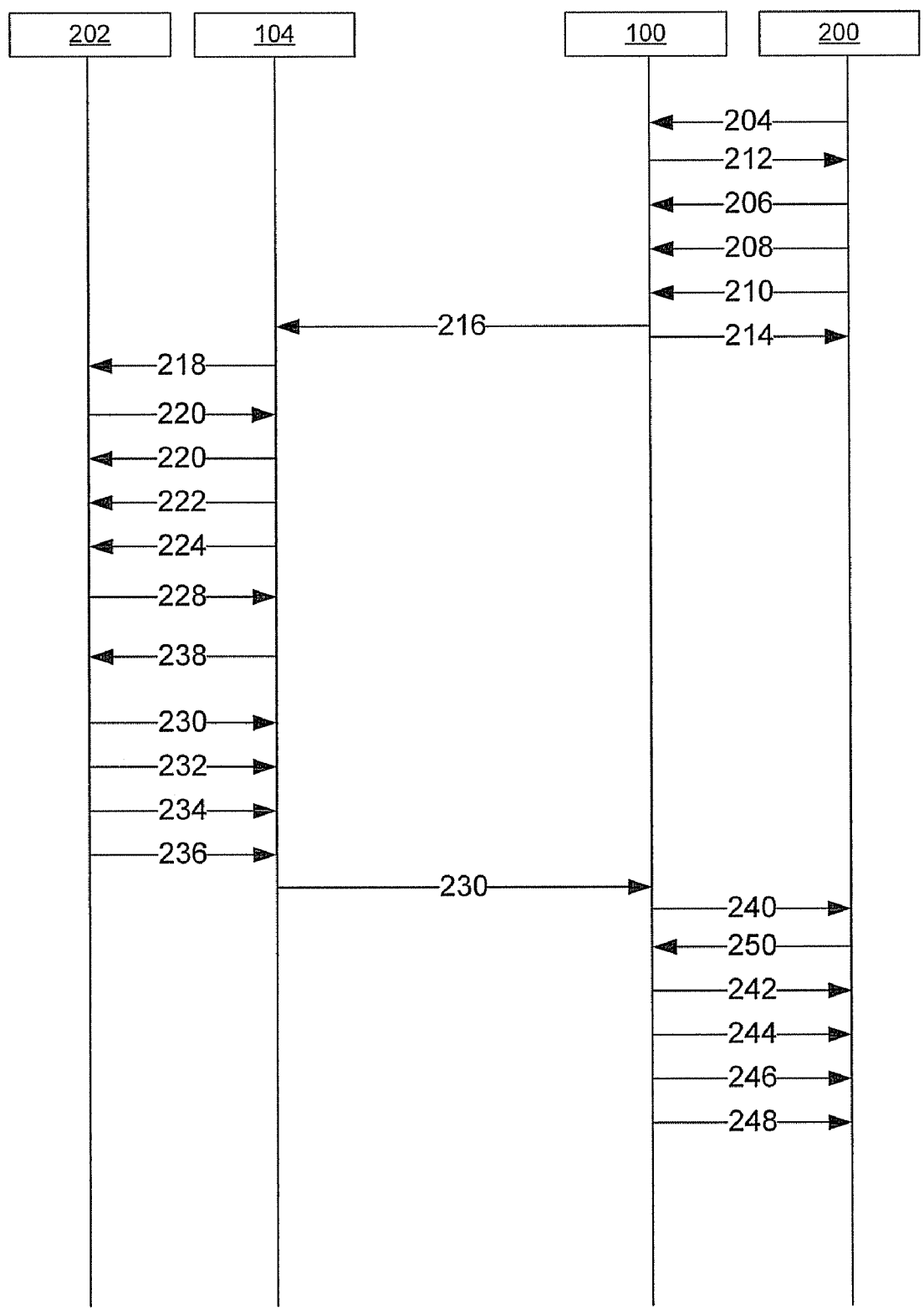
FIG. 4 shows a flow chart of this message exchange on the level of the transport protocols.

The latter is illustrated in the flow chart of FIG. 4 which, using the example of an exemplary diagnosis request and the associated response, shows the data exchange between tester 200 and control unit 202 via the air interface and the corresponding gateways on the level of the transport protocols. The decoupling via the transport protocols can be clearly gathered from this illustration. No individual CAN frames, but complete KWP2000 messages, are sent via the GSM path. If appropriate, these are encrypted prior to transmission via the air interface and decrypted upon reception. Thus, the CAN frames are defragmented in gateway 100 prior to transmission and the entire diagnosis-protocol message is fragmented into CAN frames in vehicle gateway 104, or vice versa in the case of a response. The message of the diagnosis protocol generated by the operator or the sequence program of tester 200 is transmitted via the CAN connection to gateway 100 in CAN frames 204, 206, 208 and 210. The transport layer in gateway device 100 handles return messages 212 and 214 required within the framework of the timing conditions of the data exchange between tester and gateway. Furthermore, the transport layer of gateway device 100 defragments the arriving messages and transmits a long, assembled diagnosis message 216 via the ISO transport protocol, using the GSM interface. Gateway device 104 receives this message, its transport protocol fragmenting these messages again and transmitting them as individual CAN frames via the CAN bus to control unit 202 to be diagnosed (messages 218, 220, 222, 224).

Furthermore, the transport layer of gateway device 104 and also the corresponding transport layer in the control unit to be diagnosed ensure the timing conditions of this communication by transmitting acknowledge signals 226, 228. A corresponding procedure is used when transmitting data from the control unit to be diagnosed to the service center. Here, too, the long diagnosis message 230, which is then transmitted via the GSM connection, is transmitted in individual fragments 228, 230, 232, 234, 236 from the control unit to be diagnosed to gateway 104. The transport layer there converts these fragments into the diagnosis message and transmits acknowledge signal 238 to comply with the timing conditions. The complete diagnosis message is then transmitted to the service center (gateway 100). The transport layer of gateway 100 fragments the received message and transmits it in fragments in accordance with the transport protocols of the tester to the tester (frames 240, 242, 244, 246, 248). The transport layer of the tester ensures compliance with the timing conditions by acknowledge signal 250.

The afore-described procedure may be used in all vehicle-related telematics services having remote action in which the mentioned preconditions are satisfied.

What is claimed is:

1. A device for a vehicle-related telematics service, comprising:
   a data terminal arranged in a vehicle, the data terminal configured to communicate wirelessly with a service center and via an interface with at least one control unit arranged in the vehicle;
   wherein the data terminal is configured to receive and transmit messages via the wireless communication and transmit and receive messages via the interface within a framework of carrying out the telematics service, a same application protocol being used both for the transmission via the wireless communication and for communication in the vehicle.

2. The device as recited in claim 1, wherein a transport protocol is provided between the at least one control unit in the vehicle and the data terminal, and wherein to ensure the communication, the transport protocol prescribes timing conditions that, using an arrangement of the data terminal, are considerably shorter than are able to be realized via the wireless communication.

3. The device as recited in claim 2, wherein time-correct signals are transmitted to comply with the timing conditions.

4. The device as recited in claim 3, wherein a complete message is received or transmitted via the wireless communication, and wherein the complete message is fragmented or defragmented in the data terminal for in-vehicle communication.

5. The device as recited in claim 2, wherein the data terminal is used to implement a message received via the wireless communication or a message to be transmitted via the wireless communication onto the vehicle transport protocol.

6. The device as recited in claim 1, wherein the vehicle-related telematics service is a remote diagnosis, and a diagnosis protocol KWP2000 is used as an application protocol.

7. The device as recited in claim 1, further comprising:
   data terminal programs for the vehicle-related telematics service, which include a table for configuration of the at least one control unit in the vehicle, and which implement received messages onto a vehicle subsystem to which the at least one control unit is connected.

8. A device for a vehicle-related telematics service, comprising:
   a gateway part of a service center being connected to a vehicle via wireless communication;
   an interface to connect a tester;
   wherein the gateway includes a transport protocol layer which implements data arriving or transmitted via the wireless communication onto the transport protocol for communication with the tester, and
   wherein a data terminal is configured to receive and transmit messages via the wireless communication and to transmit and receive messages via the interface within a framework of carrying out the telematics service, a same application protocol being used both for the transmission via the wireless communication and for communication in the vehicle.

9. The device as recited in claim 8, wherein a transport protocol is provided between the at least one control unit in the vehicle and the data terminal, and wherein to ensure the communication, the transport protocol prescribes timing conditions that, using an arrangement of the data terminal, are considerably shorter than are able to be realized via the wireless communication.

10. The device as recited in claim 9, wherein time-correct signals are transmitted to comply with the timing conditions.

11. The device as recited in claim 10, wherein a complete message is received or transmitted via the wireless communication, and wherein the complete message is fragmented or defragmented in the data terminal for in-vehicle communication.

12. The device as recited in claim 9, wherein the data terminal is used to implement a message received via the wireless communication or a message to be transmitted via the wireless communication onto the vehicle transport protocol.

13. The device as recited in claim 8, wherein the vehicle-related telematics service is a remote diagnosis, and a diagnosis protocol KWP2000 is used as an application protocol.

14. The device as recited in claim 8, further comprising:
   data terminal programs for the vehicle-related telematics service, which include a table for configuration of the at least one control unit in the vehicle, and which implement received messages onto a vehicle subsystem to which the at least one control unit is connected.

* * * * *